United States Patent
Sharma et al.

(10) Patent No.: US 11,544,215 B2
(45) Date of Patent: Jan. 3, 2023

(54) SYSTEM, METHOD, AND COMPUTER PROGRAM PRODUCT FOR GENERATING A FILE STRUCTURE

(71) Applicant: Visa International Service Association, San Francisco, CA (US)

(72) Inventors: Neeraj Sharma, Singapore (SG); Sree Anoosha Chivukula, Singapore (SG)

(73) Assignee: Visa International Service Association, San Francisco, CA (US)

( * ) Notice: Subject to any disclaimer, the term of this patent is extended or adjusted under 35 U.S.C. 154(b) by 512 days.

(21) Appl. No.: 16/561,815

(22) Filed: Sep. 5, 2019

(65) Prior Publication Data

US 2021/0073172 A1 Mar. 11, 2021

(51) Int. Cl.
*G06F 16/11* (2019.01)
*H04L 67/06* (2022.01)
*G06F 16/18* (2019.01)
*G06F 16/174* (2019.01)

(52) U.S. Cl.
CPC .......... *G06F 16/11* (2019.01); *G06F 16/1744* (2019.01); *G06F 16/1873* (2019.01); *H04L 67/06* (2013.01)

(58) Field of Classification Search
CPC .. G06F 16/11; G06F 16/1873; G06F 16/1744; H04L 67/06
USPC ........................................................ 707/693
See application file for complete search history.

(56) References Cited

U.S. PATENT DOCUMENTS

| 8,880,474 B2* | 11/2014 | Mason ................ G06F 11/1464 707/649 |
| 9,274,896 B2* | 3/2016 | Mason, Jr. .......... G06F 11/1448 |
| 9,323,501 B1* | 4/2016 | Ielceanu ................... G06F 8/36 |
| 2012/0041931 A1* | 2/2012 | Ross ....................... G06F 21/64 707/693 |
| 2013/0024427 A1* | 1/2013 | Long ................... G06F 11/1448 707/674 |
| 2013/0173548 A1* | 7/2013 | Haustein ............. G06F 16/1873 707/638 |

(Continued)

OTHER PUBLICATIONS

"JDeploy!, easy report deploy", SourceForge, last updated Apr. 16, 2013, accessed May 18, 2020, retrieved from https://sourceforge.net/projects/jaspertools/.

(Continued)

*Primary Examiner* — Giovanna B Colan
(74) *Attorney, Agent, or Firm* — The Webb Law Firm

(57) ABSTRACT

Computer-implemented methods may include receiving first report template data. The first report template data may include a first version identifier identifying a first version of a report schema associated with a first report template. The first version of the report schema may be determined to be subsequent to a current version of the report schema based on the first version identifier. First sample export object data associated with the first version of the report schema may be retrieved. First sample file structure data associated with a file structure of the first version of the report schema may be determined based on the first sample export object data. A first file structure may be generated based on the first sample file structure data. The first file structure may be populated with a plurality of report templates including the first report template. Systems and computer program products are also provided.

18 Claims, 4 Drawing Sheets

(56) References Cited

U.S. PATENT DOCUMENTS

2017/0010940 A1\* 1/2017 Lacasse .............. G06F 16/1873
2019/0179876 A1\* 6/2019 Zhang ................... G06F 3/0483

OTHER PUBLICATIONS

"How to deploy Reports from development to production environment.", Jasper Tools Project Blog, archived Aug. 27, 2019, accessed May 18, 2020, retrieved from https://web.archive.org/web/20190827190913/http://jaspertools.blogspot.es/.

\* cited by examiner

SYSTEM, METHOD, AND COMPUTER PROGRAM PRODUCT FOR GENERATING A FILE STRUCTURE

BACKGROUND

Field

This disclosure relates generally to a process for generating a file structure and, in some non-limiting aspects or embodiments, to systems, methods, and computer program products for generating and populating a file structure based on sample export object data.

Technical Considerations

Certain systems may use configuration files to control certain functions performed by such systems. For example, certain servers may use configuration files for certain functions (e.g., generating reports, running applications, and/or the like). Such configuration files may include multiple data elements (e.g., report templates, fields, parameters, variables, values, and/or the like) arranged in a file structure defined by a schema. The schema(s) of such configuration file(s) may be updated, and, by extension, the configuration file(s) associated with such schema(s) may be updated.

However, when a configuration file is updated, such configuration file may need to be distributed (e.g., transmitted, communicated, and/or the like) to many servers that perform functions (e.g., generate reports and/or the like) based on the updated configuration file. It can be burdensome/expensive in terms of computing resources and time consuming to manually deploy such configuration files to all of the servers. Additionally or alternatively, dedicating a server as a development server for manually creating the configuration file and publishing such configuration file for the other servers to manually login and retrieve can also be burdensome/expensive in terms of computing resources and time. Accordingly, there is a need in the art to improve upon the implementation of these configuration files.

SUMMARY

Accordingly, disclosed are systems, methods, and computer-program products for generating a file structure.

According to some non-limiting aspects or embodiments, provided are methods for generating a file structure. In some non-limiting aspects or embodiments, methods may include receiving first report template data associated with a first report template. The first report template data may include a first version identifier identifying a first version of a report schema associated with the first report template. The first version of the report schema associated with the first report template data may be determined to be subsequent to a current version of the report schema based on the first version identifier. First sample export object data associated with the first version of the report schema may be retrieved. First sample file structure data associated with a file structure of the first version of the report schema may be determined based on the first sample export object data. A first file structure may be generated based on the first sample file structure data. The first file structure may be populated with a plurality of report templates including the first report template based on the first version of the report schema.

In some non-limiting aspects or embodiments, the file structure of the first version of the report schema may be compared to a current file structure of the report schema. Additionally or alternatively, whether the file structure of the first version of the report schema is different from the current file structure may be determined. In some non-limiting aspects or embodiments, generating the first file structure may be based on determining the file structure of the first version of the report schema is different from the current file structure.

In some non-limiting aspects or embodiments, the first report template data may include an Extensible Markup Language (XML) file.

In some non-limiting aspects or embodiments, second sample file structure data associated with the current version of the report schema may be generated.

In some non-limiting aspects or embodiments, the first file structure may be compressed to form a first compressed export object. Additionally or alternatively, the first compressed export object may be transmitted to at least one server. In some non-limiting aspects or embodiments, first file structure data may be generated based on the first file structure. Additionally or alternatively, the first file structure data may be compared to the first sample file structure data to validate that the first file structure matches the file structure of the first version of the report schema.

In some non-limiting aspects or embodiments, file permissions for at least one of the plurality of report templates are included in the first file structure. Additionally or alternatively, the first file structure may be compressed to form a first compressed export object. Additionally or alternatively, the first compressed export object may be transmitted to at least one server.

According to non-limiting aspects or embodiments, provided are systems for generating a file structure. In some non-limiting aspects or embodiments, systems may comprise at least one processor programmed or configured to receive first report template data associated with a first report template. The first report template data may include a first version identifier identifying a first version of a report schema associated with the first report template. The first version of the report schema associated with the first report template data may be determined to be subsequent to a current version of the report schema based on the first version identifier. First sample export object data associated with the first version of the report schema may be retrieved. First sample file structure data associated with a file structure of the first version of the report schema may be determined based on the first sample export object data. The first file structure may be populated with a plurality of report templates including the first report template based on the first version of the report schema.

In some non-limiting aspects or embodiments, the at least one processor may be further programmed or configured to compare the file structure of the first version of the report schema to a current file structure of the report schema. Additionally or alternatively, the file structure of the first version of the report schema may be determined to be different from the current file structure. In some non-limiting aspects or embodiments, the first file structure may be generated based on determining the file structure of the first version of the report schema is different from the current file structure.

In some non-limiting aspects or embodiments, the first report template data may include an Extensible Markup Language (XML) file.

In some non-limiting aspects or embodiments, the at least one processor may be further programmed or configured to generate second sample file structure data associated with the current version of the report schema.

In some non-limiting aspects or embodiments, the at least one processor may be further programmed or configured to compress the first file structure to form a first compressed export object. Additionally or alternatively, the first compressed export object may be transmitted to at least one server. In some non-limiting aspects or embodiments, the at least one processor may be further programmed or configured to generate first file structure data based on the first file structure. Additionally or alternatively, the first file structure data may be compared to the first sample file structure data to validate that the first file structure matches the file structure of the first version of the report schema.

In some non-limiting aspects or embodiments, the at least one processor may be further programmed or configured to define file permissions for one or more report templates included in the first file structure. Additionally or alternatively, the first file structure may be compressed to form a first compressed export object. Additionally or alternatively, the first compressed export object may be transmitted to at least one server.

According to non-limiting aspects or embodiments, provided are computer program products for updating a gateway. In some non-limiting aspects or embodiments, the computer program products may comprise at least one non-transitory computer-readable medium including one or more instructions that, when executed by at least one processor, cause the at least one processor to receive first report template data associated with a first report template. The first report template data may include a first version identifier identifying a first version of a report schema associated with the first report template. The first version of the report schema associated with the first report template data may be determined to be subsequent to a current version of the report schema based on the first version identifier. First sample export object data associated with the first version of the report schema may be retrieved. First sample file structure data associated with a file structure of the first version of the report schema may be determined based on the first sample export object data. The first file structure may be populated with a plurality of report templates including the first report template based on the first version of the report schema.

In some non-limiting aspects or embodiments, the one or more instructions may further cause the at least one processor to compare the file structure of the first version of the report schema to a current file structure of the report schema. Additionally or alternatively, the file structure of the first version of the report schema may be determined to be different from the current file structure. In some non-limiting aspects or embodiments, generating the first file structure may be based on determining the file structure of the first version of the report schema is different from the current file structure.

In some non-limiting aspects or embodiments, the first report template data may include an Extensible Markup Language (XML) file.

In some non-limiting aspects or embodiments, the one or more instructions may further cause the at least one processor to generate second sample file structure data associated with the current version of the report schema.

In some non-limiting aspects or embodiments, the one or more instructions may further cause the at least one processor to compress the first file structure to form a first compressed export object. Additionally or alternatively, the first compressed export object may be transmitted to at least one server.

In some non-limiting aspects or embodiments, the one or more instructions may further cause the at least one processor to generate first file structure data based on the first file structure data. The first file structure data may be compared to the first sample file structure data to validate that the first file structure matches the file structure of the first version of the report schema.

In some non-limiting aspects or embodiments, the one or more instructions may further cause the at least one processor to define file permissions for one or more report templates included in the first file structure. Additionally or alternatively, the first file structure may be compressed to form a first compressed export object. Additionally or alternatively, the first compressed export object may be transmitted to at least one server.

Further non-limiting aspects or embodiments are set forth in the following numbered clauses:

Clause 1. A method, comprising: receiving, with at least one processor, first report template data associated with a first report template, the first report template data comprising a first version identifier identifying a first version of a report schema associated with the first report template; determining, with at least one processor, the first version of the report schema associated with the first report template data is subsequent to a current version of the report schema based on the first version identifier; retrieving, with at least one processor, first sample export object data associated with the first version of the report schema; determining, with at least one processor, first sample file structure data associated with a file structure of the first version of the report schema based on the first sample export object data; generating, with at least one processor, a first file structure based on the first sample file structure data; and populating, with at least one processor, the first file structure with a plurality of report templates including the first report template based on the first version of the report schema.

Clause 2. The method according to clause 1, further comprising: comparing, with at least one processor, the file structure of the first version of the report schema to a current file structure of the report schema; and determining, with at least one processor, that the file structure of the first version of the report schema is different from the current file structure; wherein generating the first file structure is based on determining the file structure of the first version of the report schema is different from the current file structure.

Clause 3. The method according to clauses 1 or 2, wherein the first report template data comprises an Extensible Markup Language (XML) file.

Clause 4. The method according to any of clauses 1-3, further comprising: generating, with at least one processor, second sample file structure data associated with the current version of the report schema.

Clause 5. The method according to any of clauses 1-4, further comprising: compressing, with at least one processor, the first file structure to form a first compressed export object; and transmitting, with at least one processor, the first compressed export object to at least one server.

Clause 6. The method according to any of clauses 1-5, further comprising: generating, with at least one processor, first file structure data based on the first file structure; and comparing, with at least one processor, the first file structure data to the first sample file structure data to validate that the first file structure matches the file structure of the first version of the report schema.

Clause 7. The method according to any of clauses 1-6, further comprising: defining, with at least one processor, file permissions for at least one of the plurality of report templates included in the first file structure; compressing, with at least one processor, the first file structure to form a first compressed export object; and transmitting, with at least one processor, the first compressed export object to at least one server.

Clause 8. A system, comprising: at least one processor programmed or configured to: receive first report template data associated with a first report template, the first report template data comprising a first version identifier identifying a first version of a report schema associated with the first report template; determine the first version of the report schema associated with the first report template data is subsequent to a current version of the report schema based on the first version identifier; retrieve first sample export object data associated with the first version of the report schema; determine first sample file structure data associated with a file structure of the first version of the report schema based on the first sample export object data; and populate the first file structure with a plurality of report templates including the first report template based on the first version of the report schema.

Clause 9. The system according to clause 8, wherein the at least one processor is further programmed or configured to: compare the file structure of the first version of the report schema to a current file structure of the report schema; and determine that the file structure of the first version of the report schema is different from the current file structure, wherein generating the first file structure is based on determining the file structure of the first version of the report schema is different from the current file structure.

Clause 10. The system according to clauses 8 or 9, wherein the first report template data comprises an Extensible Markup Language (XML) file.

Clause 11. The system according to any of clauses 8-10, wherein the at least one processor is further programmed or configured to: generate second sample file structure data associated with the current version of the report schema.

Clause 12. The system according to any of clauses 8-11, wherein the at least one processor is further programmed or configured to: compress the first file structure to form a first compressed export object; and transmit the first compressed export object to at least one server.

Clause 13. The system according to any of clauses 8-12, wherein the at least one processor is further programmed or configured to: generate first file structure data based on the first file structure; and compare the first file structure data to the first sample file structure data to validate that the first file structure matches the file structure of the first version of the report schema.

Clause 14. The system according to any of clauses 8-13, wherein the at least one processor is further programmed or configured to: define file permissions for at least one of the plurality of report templates included in the first file structure; compress the first file structure to form a first compressed export object; and transmit the first compressed export object to at least one server.

Clause 15. A computer program product comprising at least one non-transitory computer-readable medium including one or more instructions that, when executed by at least one processor, cause the at least one processor to: receive first report template data associated with a first report template, the first report template data comprising a first version identifier identifying a first version of a report schema associated with the first report template; determine the first version of the report schema associated with the first report template data is subsequent to a current version of the report schema based on the first version identifier; retrieve first sample export object data associated with the first version of the report schema; determine first sample file structure data associated with a file structure of the first version of the report schema based on the first sample export object data; and populate the first file structure with a plurality of report templates including the first report template based on the first version of the report schema.

Clause 16. The computer program product according to clause 15, wherein the one or more instructions further cause the at least one processor to: compare the file structure of the first version of the report schema to a current file structure of the report schema; and determine that the file structure of the first version of the report schema is different from the current file structure, wherein generating the first file structure is based on determining the file structure of the first version of the report schema is different from the current file structure.

Clause 17. The computer program product according to clauses 15 or 16, wherein the first report template data comprises an Extensible Markup Language (XML) file.

Clause 18. The computer program product according to any of clauses 15-17, wherein the one or more instructions further cause the at least one processor to: generate second sample file structure data associated with the current version of the report schema.

Clause 19. The computer program product according to any of clauses 15-18, wherein the one or more instructions further cause the at least one processor to: compress the first file structure to form a first compressed export object; and transmit the first compressed export object to at least one server.

Clause 20. The computer program product according to any of clauses 15-19, wherein the one or more instructions further cause the at least one processor to: generate first file structure data based on the first file structure data; and compare the first file structure data to the first sample file structure data to validate that the first file structure matches the file structure of the first version of the report schema.

Clause 21. The computer program product according to any of clauses 15-20, wherein the one or more instructions further cause the at least one processor to: define file permissions for one or more report templates included in the first file structure; compress the first file structure to form a first compressed export object; and transmit the first compressed export object to at least one server.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

DESCRIPTION

Figure 1:
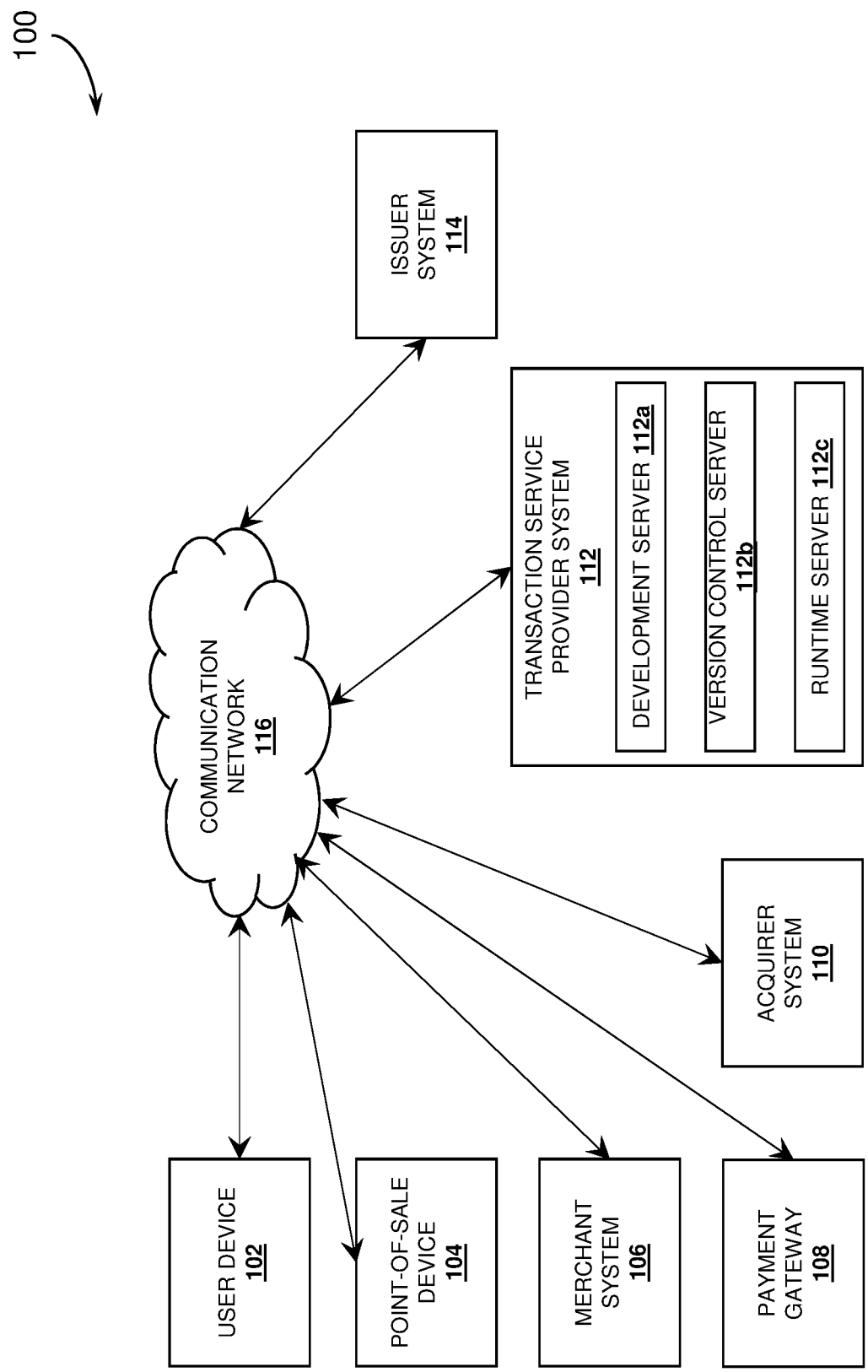
FIG. 1 is a diagram of a non-limiting aspect or embodiment of a process for updating a gateway.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting aspects or embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting aspects or embodiments, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting aspects or embodiments, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting aspects or embodiments, the account identifier may be an original account identifier, where the original account identifier was provided to a user at the creation of the account associated with the account identifier. In some non-limiting aspects or embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting aspects or embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting aspects or embodiments, an original account identifier, such as a PAN, may be associated with a plurality of tokens for different individuals or purposes. In some non-limiting aspects or embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "POS system" may refer to one or more client devices and/or peripheral devices used by a merchant to conduct a transaction. For example, a POS system may include one or more POS devices and/or other like devices that may be used to conduct a payment transaction. In some non-limiting aspects or embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting aspects or embodiments, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting aspects or embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting aspects or embodiments, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. The term "computing system" may include one or more computing devices or computers. The term "application" refers to computer code or other data stored on a computer-readable medium that may be executed by a processor to facilitate the interaction between software components, such as a client-side front-end and/or server-side back-end for receiving data from the client. The term "interface" refers to a generated display, such as one or more graphical user interfaces (GUIs) with which a user may interact, either directly or indirectly (e.g., through a keyboard, mouse, touchscreen, and/or the like). Further, multiple computers, e.g., servers, or other computerized devices directly or indirectly communicating in the network environment may constitute a "system" or a "computing system."

As used herein, the terms "client" and "client device" may refer to one or more computing devices, such as processors, storage devices, and/or similar computer components, that access a service made available by a server. In some non-limiting aspects or embodiments, a "client device" may refer to one or more devices that facilitate payment transactions, such as POS devices and/or POS systems used by a merchant. In some non-limiting aspects or embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components, that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

According to some non-limiting aspects or embodiments, provided are computer-implemented methods, systems, and computer-program products for updating a gateway. In some non-limiting aspects or embodiments, a version control server, which may be integrated into one or more systems, such as a transaction service provider system or payment gateway, may receive a report template and determine the report template is updated. For example, the version control server may receive first report template data associated with a first report template, determine the first version of the report schema associated with the first report template data is subsequent to a current version of the report schema based on the first version identifier and retrieve (e.g., automatically) first sample export object data associated with the first version of the report schema, the first sample export object data associated with a first sample export object (e.g., an XML structure containing all paths and file types for a particular compressed file). The version control server may determine first sample file structure data associated with a file structure of the first version of the report schema based on the first sample export object data. Based on the first sample file structure data, the version control server may generate a first file structure and populate the first file structure with a plurality of report templates including the first report template based on the first version of the report schema. In this way, embodiments presently disclosed may reduce and/or eliminate the need for manual review and export of updated export objects (e.g., configuration files including report templates and/or the like) once the contents of such objects (e.g., a report template and/or the like) is edited. This, in turn, reduces delay in deploying such objects (e.g., with updated report templates) as well as the inclusion of possible errors in file structures (e.g., libraries of report templates and/or the like). As such, the disclosed subject matter may, for example, reduce the burden/expense in terms of computing resources and time for generating and populating file structures for configuration files and/or distributing such configuration files to servers.

Referring now to FIG. 1, illustrated is a diagram of a system 100 for authenticating devices according to non-limiting aspects or embodiments. As illustrated in FIG. 1, the system 100 comprises a user device 102, a point-of-sale (POS) device 104, a merchant system 106, a payment gateway 108, an acquirer system 110, a transaction service provider system 112, an issuer system 114, and a communication network 116. The user device 102, POS device 104, merchant system 106, payment gateway 108, acquirer system 110, transaction service provider system 112, and/or issuer system 114 may be in communication via the communication network 116 and/or one or more wired connections, wireless connections, or a combination of wired and wireless connections. Although FIG. 1 shows all of the components of the system 100 communicating with the communication network 116, it will be appreciated that multiple communication networks may be used and that all components may not communicate through the same network.

The user device 102 may include a computing device capable of communicating data to and/or from the POS device 104, the merchant system 106, the payment gateway 108, the acquirer system 110, the transaction service provider system 112, and/or the issuer system 114 via the communication network 116. The user device 102 may be configured to receive information from the POS device 104 and/or the merchant system 106 via a communication connection (e.g., an NFC communication connection, an RFID communication connection, a Bluetooth® communication connection, and/or the like) and transmit information to the POS device 104 and/or the merchant system 106.

The POS device 104 may include one or more computing devices capable of communicating data to and/or from the user device 102, the merchant system 106, the payment gateway 108, the acquirer system 110, the transaction service provider system 112, and/or the issuer system 114 via the communication network 116 or other network. For example, the POS device 104 may include a device capable of receiving information from user device 102 and/or merchant system 106 via a communication connection, and transmitting information to user device 102 and/or merchant system 106, and/or otherwise communicating information to and/or from the user device 102 and/or merchant system 106. In some non-limiting aspects or embodiments, the POS device 104 may be associated with a merchant as described herein. In some non-limiting aspects or embodiments, the POS device 104 may be a mobile POS device (e.g., a hand-held computing device such as a smartphone) capable of communicating information and/or data from one or more locations.

The merchant system 106 may include one or more computing devices capable of communicating data to and/or from the user device 102, the POS device 104, the payment gateway 108, the acquirer system 110, the transaction service provider system 112, and/or the issuer system 114 via the communication network 116 or other network. For example, the merchant system 106 may include a device capable of receiving information from user device 102 and/or the POS device 104 via a communication connection (e.g., an NFC communication connection, an RFID communication connection, a Bluetooth® communication connection, and/or the like), transmitting information to the user device 102 and/or the POS device 104, and/or otherwise communicating information to and/or from the user device 102 and/or the POS device 104 via the communication connection. In some non-limiting aspects or embodiments, the merchant system 106 may include a computing device, such as a server, a group of servers, a client device, a group of client devices, and/or other like devices. In some non-limiting aspects or embodiments, the POS device 104 may be part of the merchant system 106 and/or may be associated with a merchant, as described herein.

The payment gateway 108 may include one or more computing devices capable of communicating data to and/or from the user device 102, the POS device 104, the merchant system 106, the acquirer system 110, the transaction service provider system 112, and/or the issuer system 114 via the communication network 116 or other network. For example, the payment gateway 108 may include a server, a group of servers, and/or other like computing devices. In some non-limiting aspects or embodiments, the payment gateway 108 may be associated with a transaction service provider, as described herein. Additionally or alternatively, the payment gateway 108 may be part of the transaction service provider system 112 and/or may be associated with a transaction service provider, as described herein.

The acquirer system 110 may include one or more computing devices capable of communicating data to and/or from the user device 102, the POS device 104, the merchant system 106, the payment gateway 108, the transaction service provider system 112, and/or the issuer system 114 via the communication network 116 or other network. For example, the acquirer system 110 may include a server, a group of servers, and/or other like devices. In some non-limiting aspects or embodiments, the acquirer system 110 may be associated with an acquirer as described herein.

The transaction service provider system 112 may include one or more computing devices capable of communicating data to and/or from the user device 102, the POS device 104, the merchant system 106, the payment gateway 108, the acquirer system 110, and/or the issuer system 114 via the communication network 116 or another network. For example, the transaction service provider system 112 may include a server (e.g., a transaction processing server), a group of servers, and/or other like devices. In some non-limiting aspects or embodiments, the transaction service provider system 112 may be associated with a transaction service provider as described herein.

In some non-limiting aspects or embodiments, a development server 112a may include one or more devices and/or servers (e.g., one or more devices of transaction service provider system 112). The development server 112a may be included in a transaction service provider system 112 and/or may be associated with a transaction service provider, as described herein. In some non-limiting aspects or embodiments, a development server 112a may include one or more computing devices capable of communicating data to and/or from the transaction service provider system 112, a version control server 112b, and/or a runtime server 112c.

In some non-limiting aspects or embodiments, a version control server 112b may include one or more devices and/or servers (e.g., one or more devices of transaction service provider system 112). The version control server 112b may be included in a transaction service provider system 112 and/or may be associated with a transaction service provider, as described herein. In some non-limiting aspects or embodiments, the version control server 112b may include one or more computing devices capable of communicating data to and/or from the transaction service provider system 112, a development server 112a, and/or a runtime server 112c.

In some non-limiting aspects or embodiments, a runtime server 112c may include one or more devices and/or servers (e.g., one or more devices of transaction service provider system 112). The runtime server 112a may be included in a transaction service provider system 112 and/or may be associated with a transaction service provider, as described herein. In some non-limiting aspects or embodiments, the runtime server 112c may include one or more computing devices capable of communicating data to and/or from the transaction service provider system 112, a development server 112a, a runtime server 112c, a merchant system 106, a payment gateway 108, an acquirer system 112, and/or an issuer system 114.

The issuer system 114 may include one or more computing devices capable of communicating data to and/or from the user device 102, the POS device 104, the merchant system 106, the payment gateway 108, the acquirer system 110, and/or the transaction service provider system 112 via the communication network 116 or another network. For example, the issuer system 114 may include a server, a group of servers, and/or other like devices. In some non-limiting aspects or embodiments, the issuer system 114 may be associated with an issuer institution that issued a payment account or instrument (e.g., a credit account, a debit account, a credit card, a debit card, and/or the like) to a user (e.g., a user associated with the user device 102, and/or the like).

The communication network 116 may include one or more wired and/or wireless networks. For example, the communication network 116 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems, devices, and networks shown in FIG. 1 are provided as an example. There may be additional systems, devices, and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG.

1 can be implemented as multiple, distributed systems or devices. Additionally or alternatively, a set of systems or a set of devices (e.g., one or more systems, one or more devices) of system 100 may perform one or more functions described as being performed by another set of systems or another set of devices of system 100.

In some non-limiting aspects or embodiments, transaction data associated with a transaction may include transaction parameters associated with the transaction, such as payment transactions initiated and/or conducted with a computing device (e.g., via an internet browser of a computing device), with an electronic wallet application, and/or the like. Non-limiting examples of transaction parameters include: electronic wallet card data associated with a payment device and/or account identifier, decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, password, and/or the like), data associated with a transaction amount (e.g., an approved limit, a transaction value, and/or the like), data associated with a transaction date and time, data associated with a conversion rate of a currency, data associated with a merchant type (e.g., goods, grocery, fuel, and/or the like), data associated with an acquiring institution country, data associated with an identifier of a country associated with the payment device or account, data associated with a response code, data associated with a merchant identifier (e.g., a merchant name, a merchant location, and/or the like), data associated with a type of currency corresponding to funds stored in association with the PAN, and/or the like.

Figure 2:
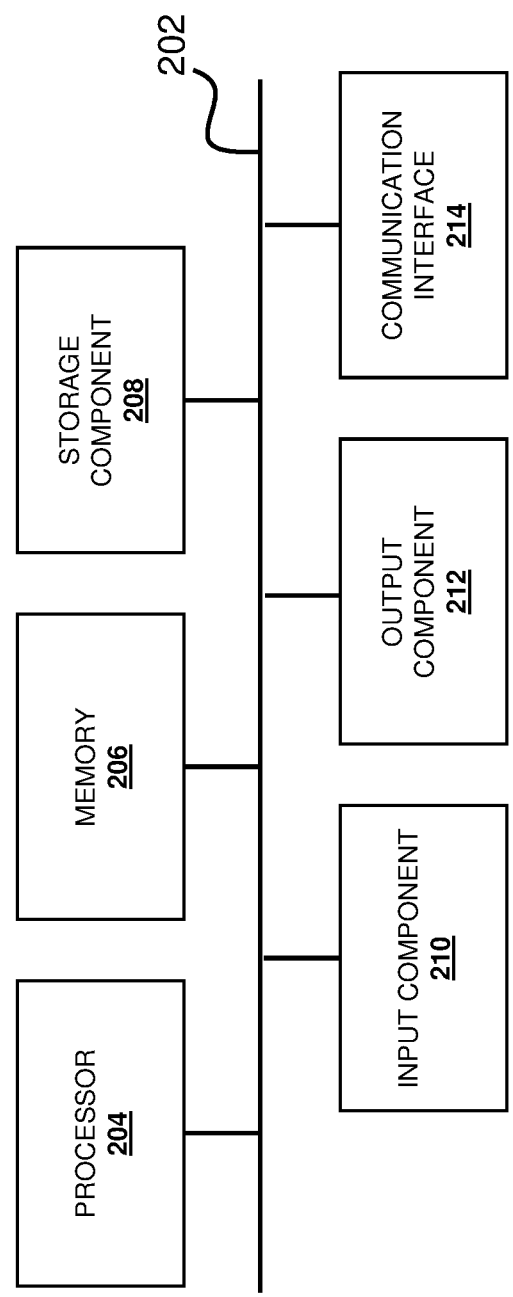
FIG. 2 is a diagram of a non-limiting aspect or embodiment of components of one or more devices and/or one or more systems of FIG. 1.

Referring now to FIG. 2, illustrated is a diagram of example components of a device 200. The device 200 may correspond to one or more components of the user device 102, the POS device 104, the merchant system 106, the payment gateway 108, the acquirer system 110, the transaction service provider system 112, and/or the issuer system 114. As shown in FIG. 2, the device 200 may include a bus 202, a processor 204, memory 206, a storage component 208, an input component 210, an output component 212, and a communication interface 214.

The bus 202 may include a component that permits communication among the components of the device 200. In some non-limiting aspects or embodiments, the processor 204 may be implemented in hardware, software, or a combination of hardware and software. For example, the processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. The memory 206 may include random access memory (RAM), read-only memory (ROM), and/or another type of dynamic or static storage device (e.g., flash memory, magnetic memory, optical memory, and/or the like) that stores information and/or instructions for use by processor 204.

The storage component 208 may store information and/or software related to the operation and use of the device 200. For example, the storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

The input component 210 may include a component that permits device 200 to receive information, such as via user input (e.g., a touchscreen display, a keyboard, a keypad, a mouse, a button, a switch, a microphone, a camera, and/or the like). Additionally or alternatively, the input component 210 may include a sensor for sensing information (e.g., a global positioning system (GPS) component, an accelerometer, a gyroscope, an actuator, and/or the like). The output component 212 may include a component that provides output information from device 200 (e.g., a display, a speaker, one or more light-emitting diodes (LEDs), and/or the like).

The communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. The communication interface 214 may permit the device 200 to receive information from another device and/or provide information to another device. For example, the communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 200 may perform one or more processes described herein. The device 200 may perform these processes based on the processor 204 executing software instructions stored by a computer-readable medium, such as the memory 206 and/or the storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into the memory 206 and/or the storage component 208 from another computer-readable medium or from another device via the communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The memory 206 and/or the storage component 208 may include data storage or one or more data structures (e.g., a database, and/or the like). The device 200 may be capable of receiving information from, storing information in, communicating information to, or searching information stored in the data storage or one or more data structures in the memory 206 and/or the storage component 208. For example, the information may include encryption data, input data, output data, transaction data, account data, or any combination thereof.

The number and arrangement of components shown in FIG. 2 are provided as an example. In some non-limiting aspects or embodiments, the device 200 may include additional components, fewer components, different components, or differently arranged components than those shown in FIG. 2. Additionally or alternatively, a set of components (e.g., one or more components) of the device 200 may perform one or more functions described as being performed by another set of components of the device 200.

Figure 3:
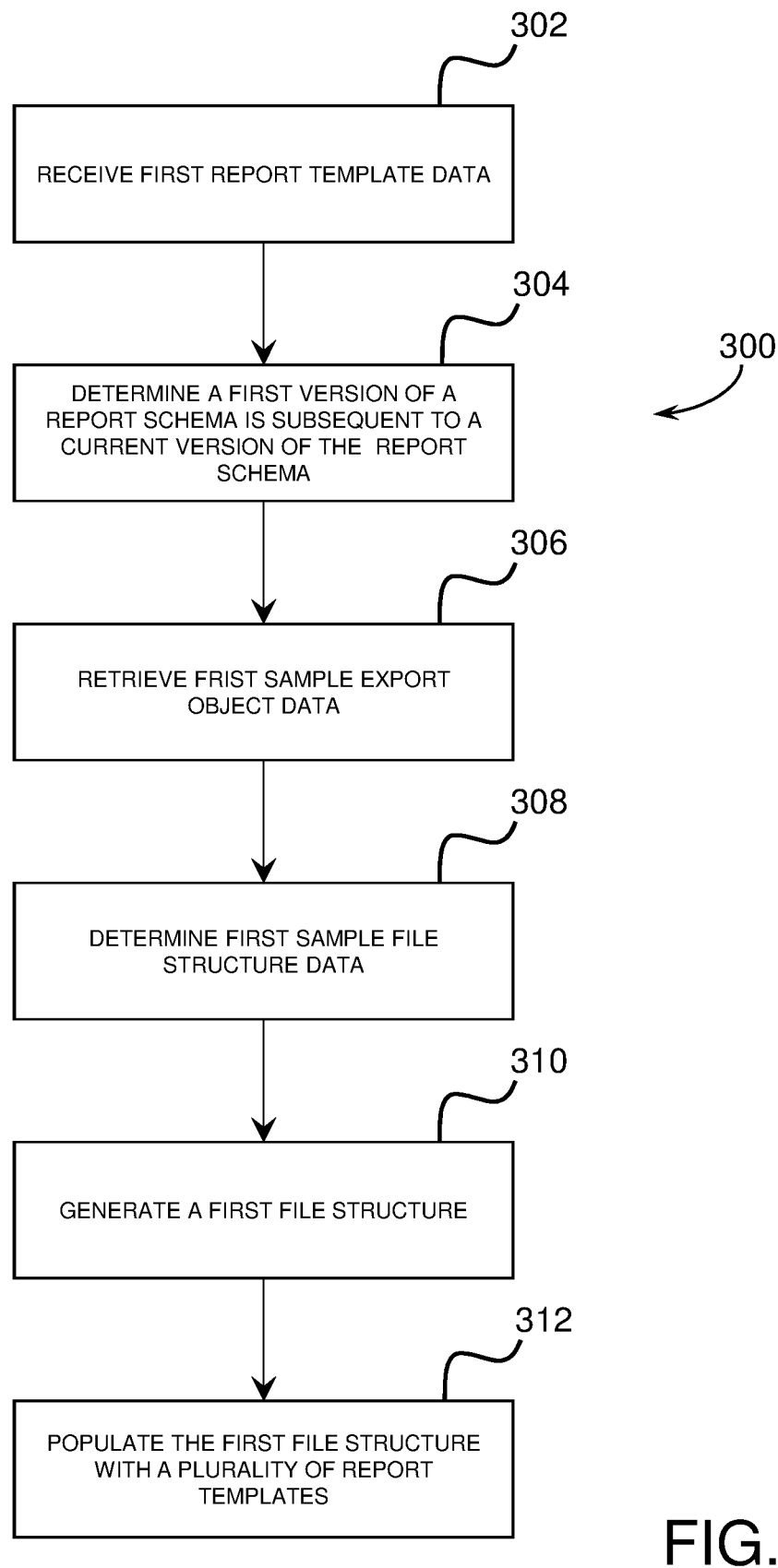
FIG. 3 is a flowchart of a non-limiting aspect or embodiment of a process for updating a gateway.

Referring now to FIG. 3, illustrated is a flowchart of a non-limiting aspect or embodiment of a process 300 for generating a file structure. In some non-limiting aspects or embodiments, one or more of the functions described with respect to process 300 may be performed (e.g., completely, partially, and/or the like) at transaction service provider system 112 (e.g., one or more devices of the transaction service provider system 112, such as development server 112a, version control server 112b, runtime server 112c, and/or the like). In some non-limiting aspects or embodiments, one or more of the functions described with respect to process 300 may be performed (e.g., completely, partially, and/or the like) by another device or a group of devices separate from or including the transaction service provider system 112, such as the merchant system 106 (e.g., one or more devices of the merchant system 106), the payment gateway 108 (e.g., one or more devices of the payment gateway 108, the acquirer system 110 (e.g., one or more devices of the acquirer system 110), the issuer system 114 (e.g., one or more devices of the issuer system 114), and/or the like.

As further shown in FIG. 3, at step 302, process 300 may include receiving first report template data associated with a first report template (e.g., an analytic report that is generated in accordance with a file such as, without limitation, a JRXML file defined by an XML schema (e.g., a Jasperreport), a JavaScript Object Notation (JSON) file, a properties file, and/or the like). In some non-limiting aspects or embodiments, version control server 112b may receive first report template data associated with a first report template (e.g., a file including text (e.g., stored in Extensible Markup Language (XML) format, JSON format, properties format, and/or the like) for structuring and/or generating one or more analytic reports requested by merchant system 106, transaction service provider system 112, issuer system 114, and/or the like). For example, version control server 112b may receive first report template data associated with a first report template from development server 112a. In such examples, development server 112a may receive input updating a report template and, based on updating the report template, may transmit the first report template data to version control server 112b. In some non-limiting aspects or embodiments, first report template data associated with a first report template may include a first version identifier that identifies a first version of a report schema (e.g., an XML tag identifying the version of the report schema according to which the first report template was generated and/or the like) according to which the first report template was generated. For example, the first report template may include a text file, the text file including text indicating the first version identifier (e.g., "Ver. 1.0," "Ver. 1.1," "Ver. 1.0.1," "Ver. 1.1.0," and/or the like). In some non-limiting aspects or embodiments, the version identifier may include at least one value associated with the version (e.g., a version number). Additionally or alternatively, the value(s) may include any suitable value or set of values to uniquely identify the version (e.g., a single number, a set of numbers, a semantic versioning number, and/or the like). For the purpose of illustration, a semantic versioning number may include three numbers separated by periods (e.g., 1.0.1) or four numbers separated by periods (e.g., 1.0.0.1), and the numbers may represent major version, minor version, patch version, and/or build version, which may be in that order. In some non-limiting embodiments, the identifier may include a string (e.g., a file name, a field name, an address and/or location on the development server 112a, and/or the like) such as "Ver." (or, e.g., "Jasper Ver." and/or the like) and a version number (e.g., 1.0.1 and/or the like).

As further shown in FIG. 3, at step 304, process 300 may include determining that a first version of a report schema is subsequent to a current version of the report schema. In some non-limiting aspects or embodiments, version control server 112b may determine that a first version of a report schema corresponding to the first report template data is subsequent to a current version of the report schema corresponding to a current report template (e.g., that the first version is an updated version relative to the current version maintained by development server 112a, version control server 112b and/or runtime server 112c). For example, version control server 112b may determine that the first version of the report schema associated with the first report template is subsequent to the current version of the report schema associated with the current report template based on the first version identifier included in the first report template, the first version identifier identifying the first version of the report schema associated with the first report template. In such an example, version control server 112b may determine that the first version of the report schema is subsequent to the current version of a report schema based on comparing the first version of the report schema to the current version of the report schema (e.g., by comparing the first version identifier to a current version identifier of the current version of the report schema maintained by development server 112a, version control server 112b, and/or runtime server 112c).

As further shown in FIG. 3, at step 306, process 300 may include retrieving first sample export object data associated with a first version of a report schema. In some non-limiting aspects or embodiments, version control server 112b may retrieve first sample export object data associated with a first version of a report schema. For example, version control server 112b may retrieve first sample export object data (e.g., an artifact including all of the paths and file types for the first version of the report schema) associated with a first version of a report schema from development server 112a. In such an example, version control server 112b may retrieve the first sample export object data based on determining that the first version of the report schema is subsequent to the current version of the report schema. For example, version control server 112b may transmit an export object request message to development server 112a to cause development server 112a to transmit the first sample export object data to version control server 112b. Additionally or alternatively, in such examples, the first sample export object data may have been generated by development server 112a in accordance with a first file structure of the first version of the report schema.

In some non-limiting aspects or embodiments, development server 112a may include one or more flags in the first sample export object data to indicate that one or more modifications were made to the file structure and/or where the one or more modifications were made to the first sample export object data (e.g., one or more modifications from the current version of the file structure of the report schema to the first version of the file structure of the report schema and/or the like).

As further shown in FIG. 3, at step 308, process 300 may include determining first sample file structure data associated with a file structure of a first version of a report schema. In some non-limiting aspects or embodiments, version control server 112b may determine first sample file structure data associated with a file structure of a first version of a report schema based on the first sample export object. For example, the first sample export object may include a ZIP file defining a ZIP folder schema, an XML file defining the file structure for the report schema, a JSON file defining the file structure for the report schema, a properties file defining the file structure for the report schema, and/or the like. In some non-limiting aspects or embodiments, version control server 112*b* may determine the first sample file structure data associated with the file structure of the first version of the report schema based on the ZIP folder schema of the first sample export object data associated with the first version of the report schema retrieved from development server 112*a*. In such examples, version control server 112*b* may unzip (e.g., decrypt, decompress, extract, and/or the like) the ZIP folder schema of the first sample export object. Additionally or alternatively, version control server 112*b* may crawl, parse, and/or the like a file structure included in the first sample export object (and/or the unzipped contents thereof) to determine the file structure of the first version of the report schema.

In some non-limiting aspects or embodiments, version control server 112*b* may compare the file structure of the first version of the report schema to the current file structure of the report schema (e.g., a ZIP file defining a ZIP folder schema, an XML file defining the file structure for the current version of the report schema, a JSON file defining the file structure for the report schema, a properties file defining the file structure for the report schema, and/or the like). For example, version control server 112*b* may compare the file structure of the first version of the report schema to the current file structure of the report schema (e.g., the current file structure previously received from development server 112*a*). In such an example, version control server 112*b* may determine that the file structure of the first version of the report schema is or is not different from the current file structure of the report schema and, based on the determination, may proceed with generation of a first file structure.

As further shown in FIG. 3, at step 310, process 300 may include generating a first file structure based on the first sample file structure data. In some non-limiting aspects or embodiments, version control server 112*b* may generate a first file structure based on the first sample file structure data (e.g., based on the file structure of the first version of the report schema). In such an example, version control server 112*b* may generate the first file structure based on determining that the file structure of the first version of the report schema is different as compared to the current version of the file structure. In such examples, the first file structure data may include one or more files stored in relation to one another (e.g., in a data structure such as a file tree and/or the like). Additionally or alternatively, version control server 112*b* may update a current file structure (e.g., a file structure generated based on current file structure data associated with a file structure of a current version of a report schema) to generate the first file structure. For example, version control server 112*b* may identify differences between the file structure of the current report schema and the file structure of the first report schema and, based on the differences, update one or more paths and/or one or more files of a current file structure dynamically (e.g., by injecting framework functionality into a current file structure by creating a subclass at runtime). In some non-limiting embodiments or aspects, version control server 112*b* may generate the first file structure based on determining that the file structure of the first version of the report schema is not different as compared to the current version of the file structure. In such an example, version control server 112*b* may generate the first file structure by copying the current file structure and replacing the current version identifier with the first version identifier (e.g., updating the current file structure to include a first version identifier).

Additionally or alternatively, a new file structure may be dynamically generated for the first file structure. For example, based on identifying a change between a current file structure and the file structure of the first version of the report schema, version control server 112*b* may generate a first file structure based on the first sample file structure data by streaming (e.g., invoking a Java streams API) the first sample export object data. In such an example, when streaming the first sample export object data, version control server 112*b* may modify one or more paths to one or more items (e.g., modules, folder permission structure data associated with one or more folder permissions, report data associated with one or more report templates, and/or the like) of the current file structure based on the one or more items included in the first sample export object. Version control server 112*b* may then store the first file structure data associated with the file structure of the first report schema (e.g., in memory, in a database, and/or the like) for later recall. For example, version control server 112*b* may then store the first file structure associated with the file structure of the first report schema such that version control server 112*b* may later compare the first file structure to another file structure to determine whether the first file structure is compatible with the another file structure. Additionally or alternatively, version control server 112*b* may store change data associated with the changes identified between the current report schema and the first report schema included in the first sample export object. For example, version control server 112*b* may store change data associated with the changes identified between the current report schema and the first report schema based on identifying the changes when generating the first file structure. In some non-limiting embodiments or aspects, version control server 112*b* may invoke one or more methods when generating the file structure of the first report schema. For example, version control server 112*b* may invoke one or more methods when generating the file structure of the first report schema by invoking one or more APIs (e.g., the Java reflection API) at runtime (e.g., when generating the first file structure).

In some non-limiting aspects or embodiments, version control server 112*b* may generate second sample file structure data associated with the current version of the report schema. For example, version control server 112*b* may generate the second sample file structure data associated with the current version of the report schema. In such examples, the second file structure data may include one or more files stored in relation to one another (e.g., in a data structure such as a file tree and/or the like). In some non-limiting aspects or embodiments, version control server 112*b* may compare the first sample file structure data with the second sample file structure data to determine whether the file structure of the first version of the report schema is different than the file structure of the current version of the report schema.

In some non-limiting aspects or embodiments, version control server 112*b* may validate the first file structure. For example, version control server 112*b* may generate first file structure data (e.g., an XML, JSON, properties, and/or the like file defining the first file structure) based on the first file structure. In such examples, version control server 112*b* may compare the first file structure data to the first sample file structure data (e.g., an XML, JSON, properties, and/or the like file defining the file structure of the first sample export object data) to validate that the first file structure matches the file structure of the first sample export object data. In some non-limiting aspects or embodiments, where the first file structure data is validated when compared to the first sample file structure data, version control server 112b may determine that the first sample file structure and the first file structure are the same and, based on the determination, continue to step 312.

As further shown in FIG. 3, at step 312, process 300 may include populating the first file structure with a plurality of report templates. In some non-limiting aspects or embodiments, version control server 112b may populate the first file structure with a plurality of report templates. For example, version control server 112b may populate the first file structure with a plurality of report templates based on the first version of the report schema. In such an example, version control server 112b may identify the plurality of report templates (e.g., by the names of each of the plurality of report templates) and version control server 112b may include the names of the plurality of report templates when populating the first file structure with the plurality of report templates. In some non-limiting aspects or embodiments, version control server 112b may populate the first file structure with one or more report templates included in the first file structure (e.g., by calling an application programming interface (API) such as the Java reflection API and/or the like). For example, version control server 112b may determine that one or more files from the first file structure correspond to one or more files included in the current file structure. In such an example, based on determining that one or more files from the first file structure correspond to one or more files included in the current file structure, version control server 112b may populate the first file structure with one or more report templates included in the one or more files of the current file structure. Additionally or alternatively, version control server 112b may populate the first file structure with one or more report templates included in the first sample export object data. Additionally or alternatively, version control server 112b may populate the first file structure with one or more report templates retrieved (e.g., requested, received, and/or the like) from the development server 112a. For example, version control server 112b may populate the first file structure with one or more report templates retrieved from the development server 112a based on determining that the one or more report templates are associated with the one or more files of the current file structure.

In some non-limiting aspects or embodiments, version control server 112b may define file permissions for one or more report templates included in the first file structure. For example, version control server 112b may define one or more permissions for one or more report templates included in the first file structure based on one or more permissions set for corresponding report templates included in the sample export object. Additionally or alternatively, version control server 112b may define the one or more permissions for the one or more report templates based on the one or more report templates. Additionally or alternatively, version control server 112b may define the one or more permissions for the one or more report templates in the first file structure based on current permissions for corresponding report templates (e.g., files) of the current file structure. Additionally or alternatively, version control server 112b may define the one or more permissions for the one or more report templates in the first file structure based on retrieving (e.g., requesting, receiving, and/or the like) corresponding permission data for each report template from development server 112a. In some non-limiting embodiments or aspects, permissions may include data associated with identifying one or more devices of FIG. 1 and/or one or more entities associated with the one or more devices of FIG. 1 that can read a file and/or write to a file included in a file structure (e.g., the current file structure, the first file structure, and/or the like). In some non-limiting embodiments or aspects, version control server 112b may generate and/or export file permission data associated with permissions for one or more files. For example, version control server 112b may generate and/or export file permission data associated with permissions for one or more files included in the first file structure. In such an example, the file permission data may be included in a file of the first file structure.

In some non-limiting aspects or embodiments, version control server 112b may define data sources for one or more report templates included in the first file structure. For example, version control server 112b may define one or more data sources for one or more report templates included in the sample export object. The one or more data sources may include address data associated with an address (e.g., an address to one or more databases, an address to one or more systems of FIG. 1 that host the one or more databases, and/or the like) to retrieve data from when generating a report in accordance with the one or more report templates.

In some non-limiting aspects or embodiments, version control server 112b may compress the first file structure to form a first compressed export object (e.g., a ZIP file, and/or the like). For example, version control server 112b may compress the first file structure based on population of the first file structure with the one or more report templates, the compressed first file structure forming the first compressed export object. In some non-limiting aspects or embodiments, version control server 112b may transmit the first compressed export object. For example, version control server 112b may transmit the first compressed export object to at least one computing device (e.g., at least one server such as runtime server 112c, development server 112a, and/or the like). In such examples, version control server 112b may transmit the first compressed export object (e.g., to runtime server 112c, development server 112a, and/or the like). In some non-limiting aspects or embodiments, version control server 112b may define new metadata for one or more of the report templates included in the first file structure (e.g., add and/or modify the corresponding portion of an XML, JSON, properties, and/or the like document defining the report schema). Additionally or alternatively, in some non-limiting aspects or embodiments, version control server 112b may include a new version identifier for one or more of the report templates included in the first file structure.

In some non-limiting aspects or embodiments, version control server 112b may determine a first compressed export object file structure data associated with a file structure of the first compressed export object. For example, version control server 112b may determine the first compressed export object file structure data associated with the first compressed export object based on the first compressed export object similarly to determining the first sample file structure data based on the first sample export object data, as described herein. In such examples, version control server 112b may parse the file structure of the first compressed export object. In such examples, version control server 112b may compare the first compressed export object file structure data to the first file structure generated based on the first sample export object to determine whether any errors occurred when generating the first file structure (e.g., if the first compressed export object file structure does not match the first file structure, then an error may have occurred).

Figure 4:
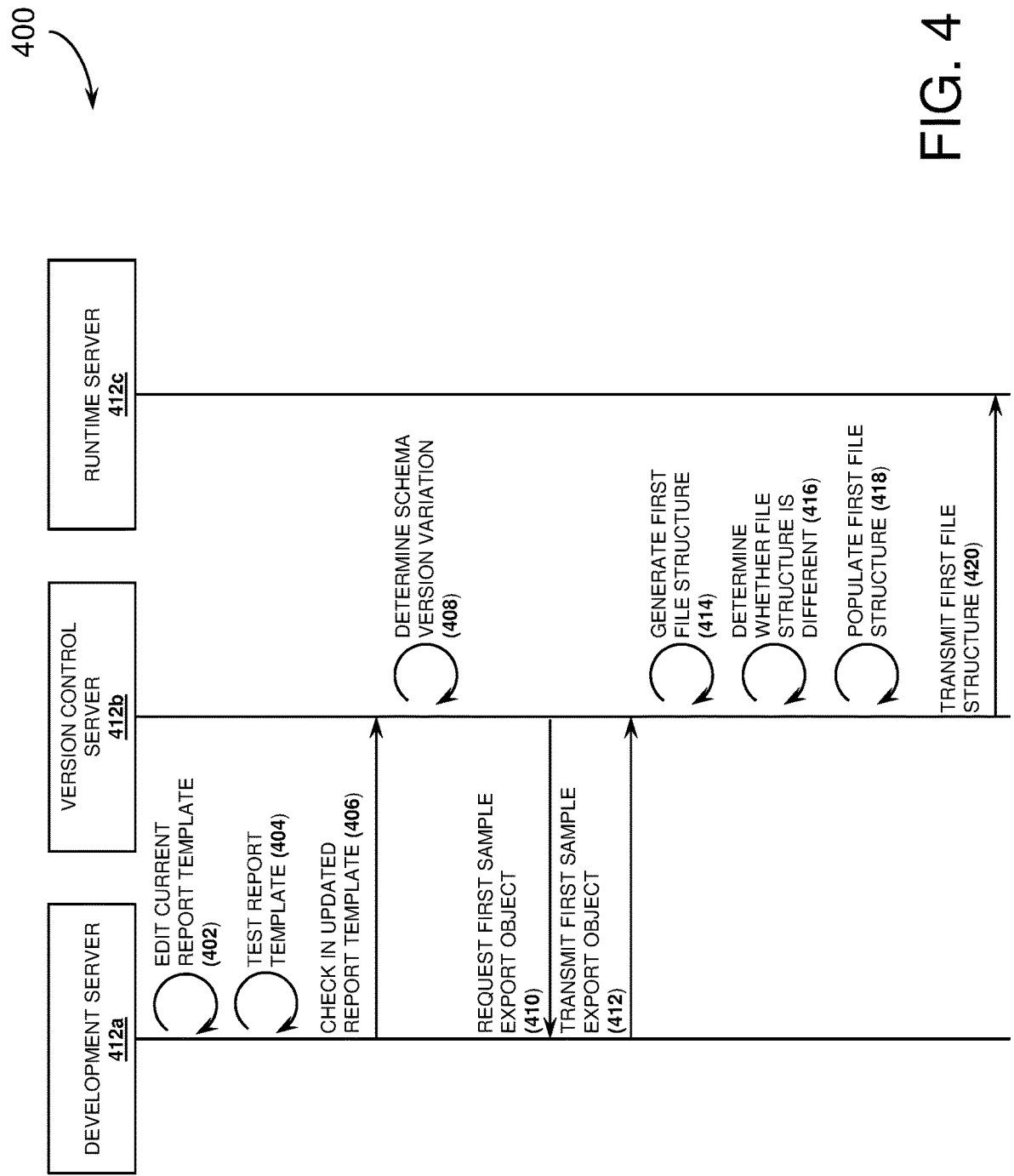
FIG. 4 is a sequence diagram of an implementation of a non-limiting aspect or embodiment of a process for updating a gateway.

Referring now to FIG. 4, illustrated is a sequence diagram of a non-limiting aspect or embodiment of an implementation 400 relating to process 300 for generating a file structure. As illustrated in FIG. 4, implementation 400 includes a development server 412a, a version control server 412b, and a runtime server 412c. Development server 412a, version control server 412b, and runtime server 412c may communicate data therebetween, as described herein. In some non-limiting aspects or embodiments, development server 412a, version control server 412b, and runtime server 412c may be components of transaction service provider system 112. In some non-limiting aspects or embodiments, development server 412a, version control server 412b, and runtime server 412c may be the same as or similar to development server 112a, version control server 112b, and runtime server 112c, respectively.

As shown by reference number 402 in FIG. 4, development server 412a may receive input that causes the development server 412a to edit a current report template. For example, development server 412a may receive input indicating that one or more changes are to be made to a current report template and, based on receiving the input, may generate first report template data associated with a first report template. Additionally or alternatively, development server 412a may receive input to create a new report template and, based on receiving the input, may generate first report template data associated with a first report template. In some non-limiting aspects or embodiments, the development server 412a may receive input via a designer application, an editor application, and/or the like. For example, development server 412a may receive input via JasperReports® designer to add, remove, modify, and/or the like a report template.

As shown by reference number 404 in FIG. 4, development server 412a may test the first report template. For example, development server 412a may generate a report based on the first report template to determine whether any errors occur when generating the report (e.g., errors that would prevent the generation of the report, and/or the like). In some non-limiting embodiments, if an error occurs or if a developer otherwise desires to modify the report template, implementation 400 may return to editing the report template (402). Additionally or alternatively, implementation 400 may proceed to checking in the report template (406).

As shown by reference number 406 in FIG. 4, development server 412a may check in the first report template. For example, development server 412a may transmit the first report template to version control server 412b (e.g., after receiving one or more edits to the report template, after testing the first report template, and/or the like). In some non-limiting aspects or embodiments, a developer may select an option (e.g., button, graphical user interface element, command line input, and/or the like) to check in or publish the first report template. Additionally or alternatively, version control server 412b may retrieve, receive, and/or the like the first report template. For example, version control server 412b may receive a notification from development server 412a that at least one report template (e.g., first report template and/or the like) has been checked in, and version control server 412b may retrieve the report template. In some non-limiting embodiments, development server 412a may generate and/or modify a version identifier (e.g., first version identifier) of at least one report template (e.g., the first report template) based on the at least one report template being checked in. For example, the development server 412a may increment and/or modify at least one value of the version identifier.

As shown by reference number 408 in FIG. 4, version control server 412b may determine that a first version of a report schema of the first report template varies from a current version of a schema of a current report template, as described herein. For example, version control server 412b may determine a first version of the report schema of the first report template based on the first version identifier.

As shown by reference number 410 in FIG. 4, version control server 412b may retrieve and/or request first sample export object data associated with a first sample export object from development server 412a, as described herein. For example, version control server 412b may retrieve and/or request the first sample export object data from development server 412a based on determining that the first version of the report schema varies from the current version of the report schema.

As shown by reference number 412 in FIG. 4, version control server 412b may receive the first sample export object data from development server 412a, as described herein.

As shown by reference number 414 in FIG. 4, version control server 412b may generate a first file structure based on receiving the first sample export object data, as described herein. For example, version control server 412b may determine first sample file structure data associated with a file structure of a first version of a report schema based on the first sample export object data. In such an example, version control server 412b may generate the first file structure based on determining the first sample file structure data.

As shown by reference number 416 in FIG. 4, version control server 412b may determine that the first file structure is different from the current file structure, as described herein. For example, version control server 412b may compare the second sample file structure data to the first sample file structure data to validate that the first files structure matches the second file structure of the current version of the report schema.

As shown by reference number 418 in FIG. 4, version control server 412b may populate the first file structure with a plurality of report templates, as described herein. For example, version control server 412b may populate the first file structure with a plurality of report templates from the current file structure. In some non-limiting aspects or embodiments, version control server 412b may include the current report template in the current file structure.

As shown by reference number 420 in FIG. 4, version control server 412b may transmit the first file structure to runtime server 412c, as described herein. For example, version control server 412b may transmit the first file structure to runtime server 412c based on populating the first file structure with the one or more report templates. In some non-limiting aspects or embodiments, version control server 412b may compress the first file structure to form a compressed export object and, once compressed, may transmit the compressed export object to runtime server 412c.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method, comprising:
receiving, by a version control server, first report template data associated with a first report template from a development device, the first report template data comprising a first version identifier identifying a first version of a report schema associated with the first report template;
determining, by the version control server, the first version of the report schema associated with the first report template data is subsequent to a current version of the report schema based on the first version identifier;
retrieving, by the version control server, first sample export object data associated with the first version of the report schema from the development device;
determining, by the version control server, first sample file structure data associated with a file structure of the first version of the report schema based on the first sample export object data;
generating, by the version control server, a first file structure based on the first sample file structure data;
populating, by the version control server, the first file structure with a plurality of report templates including the first report template based on the first version of the report schema;
retrieving, by the version control server, permission data for at least one of the plurality of report templates of the first file structure from at least one of the following: the first sample export object data, the at least one of the plurality of report templates, previous file permissions of a previous file structure, or any combination thereof; and
defining, by the version control server, file permissions for the at least one of the plurality of report templates included in the first file structure based on retrieving the permission data.

2. The method according to claim 1, further comprising:
comparing, by the version control server, the file structure of the first version of the report schema to a current file structure of the report schema; and
determining, by the version control server, that the file structure of the first version of the report schema is different from the current file structure;
wherein generating the first file structure is based on determining the file structure of the first version of the report schema is different from the current file structure.

3. The method according to claim 1, wherein the first report template data comprises an Extensible Markup Language (XML) file.

4. The method according to claim 1, further comprising:
generating, by the version control server, second sample file structure data associated with the current version of the report schema.

5. The method according to claim 1, further comprising:
compressing, by the version control server, the first file structure to form a first compressed export object; and
transmitting, by the version control server, the first compressed export object to at least one device.

6. The method according to claim 4, further comprising:
generating, by the version control server, first file structure data based on the first file structure; and
comparing, by the version control server, the first file structure data to the first sample file structure data to validate that the first file structure matches the file structure of the first version of the report schema.

7. A system, comprising:
at least one processor of a version control server programmed or configured to:
receive first report template data associated with a first report template from a development device, the first report template data comprising a first version identifier identifying a first version of a report schema associated with the first report template;
determine the first version of the report schema associated with the first report template data is subsequent to a current version of the report schema based on the first version identifier;
retrieve first sample export object data associated with the first version of the report schema from the development device;
determine first sample file structure data associated with a file structure of the first version of the report schema based on the first sample export object data;
generate a first file structure based on the first sample file structure data;
populate the first file structure with a plurality of report templates including the first report template based on the first version of the report schema;
retrieve permission data for at least one of the plurality of report templates of the first file structure from at least one of the following: the first sample export object data, the at least one of the plurality of report templates, previous file permissions of a previous file structure, or any combination thereof; and
define file permissions for the at least one of the plurality of report templates included in the first file structure based on retrieving the permission data.

8. The system according to claim 7, wherein the at least one processor of the version control server is further programmed or configured to:
compare the file structure of the first version of the report schema to a current file structure of the report schema; and
determine that the file structure of the first version of the report schema is different from the current file structure,
wherein generating the first file structure is based on determining the file structure of the first version of the report schema is different from the current file structure.

9. The system according to claim 7, wherein the first report template data comprises an Extensible Markup Language (XML) file.

10. The system according to claim 7, wherein the at least one processor of the version control server is further programmed or configured to:
generate second sample file structure data associated with the current version of the report schema.

11. The system according to claim 7, wherein the at least one processor of the version control server is further programmed or configured to:
compress the first file structure to form a first compressed export object; and
transmit the first compressed export object to at least one device.

12. The system according to claim 10, wherein the at least one processor of the version control server is further programmed or configured to:

generate first file structure data based on the first file structure; and compare the first file structure data to the first sample file structure data to validate that the first file structure matches the file structure of the first version of the report schema.

13. A computer program product comprising at least one non-transitory computer-readable medium including one or more instructions that, when executed by at least one processor of a version control server, cause the at least one processor of the version control server to:

receive first report template data associated with a first report template from a development device, the first report template data comprising a first version identifier identifying a first version of a report schema associated with the first report template;

determine the first version of the report schema associated with the first report template data is subsequent to a current version of the report schema based on the first version identifier;

retrieve first sample export object data associated with the first version of the report schema from the development device;

determine first sample file structure data associated with a file structure of the first version of the report schema based on the first sample export object data;

generate a first file structure based on the first file sample file structure data;

populate the first file structure with a plurality of report templates including the first report template based on the first version of the report schema;

retrieve permission data for at least one of the plurality of report templates of the first file structure from at least one of the following: the first sample export object data, the at least one of the plurality of report templates, previous file permissions of a previous file structure, or any combination thereof; and define file permissions for the at least one of the plurality of report templates included in the first file structure based on retrieving the permission data.

14. The computer program product according to claim 13, wherein the one or more instructions further cause the at least one processor of the version control server to:

compare the file structure of the first version of the report schema to a current file structure of the report schema; and determine that the file structure of the first version of the report schema is different from the current file structure, wherein generating the first file structure is based on determining the file structure of the first version of the report schema is different from the current file structure.

15. The computer program product according to claim 13, wherein the first report template data comprises an Extensible Markup Language (XML) file.

16. The computer program product according to claim 13, wherein the one or more instructions further cause the at least one processor of the version control server to:

generate second sample file structure data associated with the current version of the report schema.

17. The computer program product according to claim 13, wherein the one or more instructions further cause the at least one processor of the version control server to:

compress the first file structure to form a first compressed export object; and transmit the first compressed export object to at least one device.

18. The computer program product according to claim 16, wherein the one or more instructions further cause the at least one processor of the version control server to:

generate first file structure data based on the first file structure; and compare the first file structure data to the first sample file structure data to validate that the first file structure matches the file structure of the first version of the report schema.

* * * * *